United States Patent [19]

Krulik

[11] Patent Number: 4,671,861

[45] Date of Patent: Jun. 9, 1987

[54] MEASUREMENT AND CONTROL OF NET CAUSTIC PRODUCTION DURING ELECTRODIALYSIS

[75] Inventor: Gerald A. Krulik, Laguna Hills, Calif.

[73] Assignee: Morton Thiokol, Inc., Chicago, Ill.

[21] Appl. No.: 846,524

[22] Filed: Mar. 31, 1986

[51] Int. Cl.$^4$ .................................................. B01D 57/02
[52] U.S. Cl. .................................. 204/182.4; 204/151; 204/301; 204/DIG. 13
[58] Field of Search ............... 204/151, 182.4, 301, 204/DIG. 13

[56] References Cited

U.S. PATENT DOCUMENTS

| | | | |
|---|---|---|---|
| 4,289,597 | 9/1981 | Grenda | 204/182.4 |
| 4,324,629 | 4/1982 | Oka et al. | 204/DIG. 13 |
| 4,425,205 | 1/1984 | Honma et al. | 204/DIG. 13 |
| 4,549,946 | 10/1985 | Horn | 204/DIG. 13 |
| 4,600,493 | 7/1986 | Korngold | 204/DIG. 13 |

Primary Examiner—Terryence Chapman
Attorney, Agent, or Firm—Gerald K. White

[57] ABSTRACT

A method of and apparatus having utility in an electrodialysis and electrosynthesis process energized by direct eletrical current for the purification and replenishment of an electroless copper plating solution comprises indirectly measuring the hydroxide production that is put into and left in the electroless copper plating solution from a catholyte solution in which the hydroxide is synthesized by measuring the net hydronium ion content of an anolyte solution into which waste products from the electroless copper plating solution are transported, and adjusting the flow of direct electrical current in response to the net hydronium ion production in the anolyte solution.

11 Claims, 3 Drawing Figures

MEASUREMENT AND CONTROL OF NET CAUSTIC PRODUCTION DURING ELECTRODIALYSIS

BACKGROUND OF THE INVENTION

1. Field of the Invention

This invention relates to a process for chemically maintaining by electrodialysis an electroless copper plating solution and, more particularly, to an improved method of and apparatus for measuring and controlling the net hydroxyl ion ($OH^-$) production that is put into and left in the electroless copper plating bath during the electrodialysis process.

2. Description of the Prior Art

An electroless copper plating solution contains copper, usually in the form of copper sulfate, a reducing agent such as formaldehyde, a chelating agent, and an alkali metal hydroxide as essential components.

In the continued use of an electroless copper plating bath, copper sulfate, formaldehyde, and sodium hydroxide are consumed. Depletion of these components create a need for replenishing them. Additionally, as the electroless copper plating bath is used, by-product components are produced that have an inhibiting effect upon the chemical plating action and accumulate in the plating solution. Most notably, these by-product components are sodium sulfate and sodium formate.

As disclosed in U.S. Pat. No. 4,289,597 issued on Sept. 15, 1981 to David W. Grenda, and in the copending application for U.S. patent bearing Ser. No. 691,095 filed on Jan. 14, 1985 by Emmanuel Korngold now U.S. Pat. No. 4,600,493, the disclosures of which patent and copending application for patent, by reference, are incorporated herein, such by-product components may be removed, by electrodialysis from an operating electroless copper plating bath while replacing them with freshly generated hydroxide. Electrodialysis is a form of dialysis in which an electric current is used to aid the separation of substances that ionize in solution by providing a driving electric potential to cause the transference of ions across semi-permeable membranes.

During the normal operation of an electroless copper plating bath, a chemical reaction, as follows, takes place:

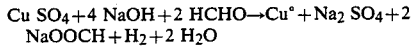

For every four moles of sodium hydroxide (NaOH) consumed, two moles of sodium formate (NaOOCH) and one mole of sodium sulfate ($Na_2SO_4$) are produced. Consequently, for each complete replacement of all of the copper in the plating bath, termed a "cycle," a certain amount of sulfate and formate is produced in the bath.

With continued use and replenishment, the sulfate and formate concentrations, increase steadily until the concentrations reach a level where the loss due to volume growth disposal and production rates are balanced. This is a so-called "steady state" condition. During the time between the preparation of a fresh bath and its steady state condition, the bath may display a gradual change in its performance characteristics. Thus, a "cycled" bath is usually always less stable against autocatalytic decomposition than a fresh bath. This is due primarily to the accumulation of sulfate and formate anions.

In traditional electrodialysis, very small electrical currents are used since charged ions only are being separated. The version of electrodialysis with which the present invention is concerned is significantly different since large electrical currents are needed. Most of this current is used to generate hydroxyl ions and also to transport them across the semi-permeable membranes.

In this version of the electrodialysis process, water in the catholyte of an electrodialytic cell is electrolyzed to form hydroxyl anions at the cathode. These electrosynthesized hydroxyl anions subsequently migrate across an anion permeable membrane into an electroless copper plating bath solution which is contained in an intermediate compartment between two such anion permeable membranes. At the same time sulfate and formate anions, together with some hydroxyl anions, transfer across the second membrane into an anolyte solution in the anode compartment of the cell.

As a result of this process, three stoichiometric exchanges take place, as follows:

Hence, the overall net exchange is:

Thus, for every mole of sulfate and two moles of formates removed, four moles of hydroxides are introduced. This is a perfect reversal of the reaction which takes place during electroless copper plating where four moles of hydroxides are consumed, producing one mole of sulfate and two moles of formates.

As the concentration of the sulfate and formate decreases, a correspondingly greater percentage of $OH^-$ will be transported across the membrane. Thus the net rate of $OH^-$ change will approach zero. As a result, the electroless copper plating bath cannot be overreplenished in caustic.

An important aspect of the electrodialysis process for the chemical maintenance of an electroless copper plating bath thus is the net hydroxyl ion production, specifically the amount of hydroxide or $OH^-$ actually put into and left in the electroless copper solution.

It has been proposed in the prior art to measure the net hydroxide production by titration of the electroless copper solution as a function of time of operation of the electrodialysis apparatus. A proposal has also been made to make this measurement by titrating aliquots of electroless copper solution taken at the entry and at the exit of the electrodialysis apparatus to get instantaneous net $OH^-$ production values. It has also been proposed to use two hydrogen ion, or "pH" probes or sensors, one at the entrance to and one at the exit from the electroless copper solution compartment of the electrodialysis apparatus, to measure the hydrogen ion differential and thus the instantaneous change in hydroxide. The latter method appears to be the only practical prior art method lending itself to automatic operation, yet it suffers from many disadvantages. These disadvantages stem from the fact that the electroless copper solution during plating conditons is normally both hot and caustic with a high pH level. Hot caustic is a difficult environment for pH probes. So applied, the useful life of the pH probe would be severely curtailed. Additionally, measurement of a small increase in OH$^-$ at a high pH level is difficult. As a result, such measurements would be inaccurate and unreliable.

Thus, there is a need and a demand for an improved method of and apparatus for measuring the amount of OH$^-$ that is actually put into and left in the electroless copper plating solution during the electrodialysis and electrosynthesis process. There is a need and a demand also for an improved method of and apparatus for effecting an appropriate control action in response to such measurement for automatically adjusting the amount of OH$^-$ that is put into and left in the electroless copper plating solution in accordance with the requirements of the electroless copper plating bath during the operation thereof.

SUMMARY OF THE INVENTION

An object of the invention is to provide, in an electrodialysis process, as aforementioned, for chemically maintaining an electroless copper plating bath, an improved method of and apparatus for automatically measuring the synthesized hydroxide production that is actually put into and left in the electroless copper solution.

Another object of the invention is to provide a control apparatus that is responsive to such measurement for automatically adjusting the amount of hydroxide that is put in the electroless copper solution in accordance with the operating requirements of the electroless copper plating bath.

In accomplishing these and other objectives of the invention, two hydrogen ion or pH probes or sensors are positioned, in accordance with the invention, in the anolyte stream or solution, one at the entrance to and one at the exit from the electrodialysis apparatus. The difference in acid pH measurement of the two sensors is equal to the net hydroxyl ion or OH$^-$ production when the flow is also known. Such measurement of the net hydronium ion production in the anolyte solution, and hence of the hydroxyl ion production in the electroless copper plating solution is made without any interference from high existing caustic levels in the electroless copper solution.

The invention stems from the realization that, due to various electrochemical laws, the net hydronium ion (H$^+$) production in the anolyte solution of the electrodialysis apparatus must be exactly the same as the net hydroxyl ion (OH$^-$) production in the catholyte solution. Therefore, any measured difference in pH in the anolyte solution is due solely to the net hydroxide production put into and left in the electroless copper solution from the catholyte solution.

The anolyte solution input may be deionized water or tap water to which at start-up, sulfuric acid or an equivalent neutral conductive ion, such as sodium sulfate, is added to provide an initial pH of less than 2 and preferably less than 1.7.

It is noted that the initial low pH level for the anolyte solution is necessary in order that electrical currents of practically operative magnitude may flow through the electrodialysis apparatus.

Additionally, with this method of measuring the hydroxide production put into and left in the electroless copper solution, there is no interference due to pre-existing acid levels in the anolyte solution. Furthermore, it is the degree of ionization of the chemical acid or base comprising the anolyte solution that controls the difference in the pH measurements, not necessarily the molar concentration. The acidic anolyte solution contains a sufficiently dilute acidic solution so that ionization can be assumed to be nearly complete. Consequently, the pH difference measurements easily and directly equate with the H$^+$ production in the anolyte solution since excess H$^+$ is not tied up in unionized form. As contrasted to this, much OH$^-$ in the electroless copper solution can be unassociated NaOH due to the high pre-existing OH$^-$ concentration, and the relatively highly concentrated chemical solution used for electroless copper plating bath.

One limitation on direct pH measurement in electroless copper plating baths is that pH is not generally used for bath control. Instead, the practice is to titrate an aliquot with the result being expressed in grams/liter of NaOH. This figure is always much greater than would be mathematically calculated from the pH measurement alone, due to the high buffering capacity of the electroless copper plating bath. The acid anolyte is not appreciably buffered and, therefore, provides a direct, easily read read-out.

As those skilled in the art will understand, the invention is not limited to the use of hydrogen ion sensors or probes for measuring the acid content of the anolyte solution as a means of ascertaining the net OH$^-$ content of the electroless copper plating solution. Thus, other methods such as colorimetric, electrical conductivity, specific gravity, refractive index, titration, etc. may be used in making this determination.

Also, there is provided in accordance with the invention, a suitable electronic computer that is arranged to respond to the differential output signal generated by the pH sensors and also to a measurement of the anolyte solution flow. Stored in the memory of the computer is a table of molar concentration of acid ions for given values of pH. The stored values of molar concentration of acid ions may be in terms of grams/liter of H$_2$SO$_4$. After referring to the table, the computer makes a computation comprising multiplying the difference between the two hydrogen ion molar concentrations by the flow rate of the anolyte solution (in liters/minute) to give the net production of OH$^-$ per minute in the electroless copper solution. Thus, the computer converts to equivalent OH$^-$ in the electroless copper plating solution the difference in the two pH determinations at the flow rate of the anolyte solution.

The response is utilized to adjust a direct electrical current control device for varying the magnitude of direct electrical current that flows through the electrodialysis apparatus from a source of such direct electrical current. Thus, the amount of hydroxide that is put into and left in the electroless copper solution is automatically varied in accordance with the requirements of the electroless copper plating bath.

The various features of novelty which characterize the present invention are pointed out with particularity in the claims annexed to and forming a part of this specification. For a better understanding of the invention, its operating advantages, and specific objects attained by its use, reference is made to the accompanying drawings and descriptive matter in which preferred embodiments of the invention are illustrated.

BRIEF DESCRIPTION OF THE DRAWINGS

With this description of the invention, a detailed description follows with reference being made to the accompanying drawings which form part of the specification, of which.

DESCRIPTION OF THE PREFERRED EMBODIMENTS

Figure 1:
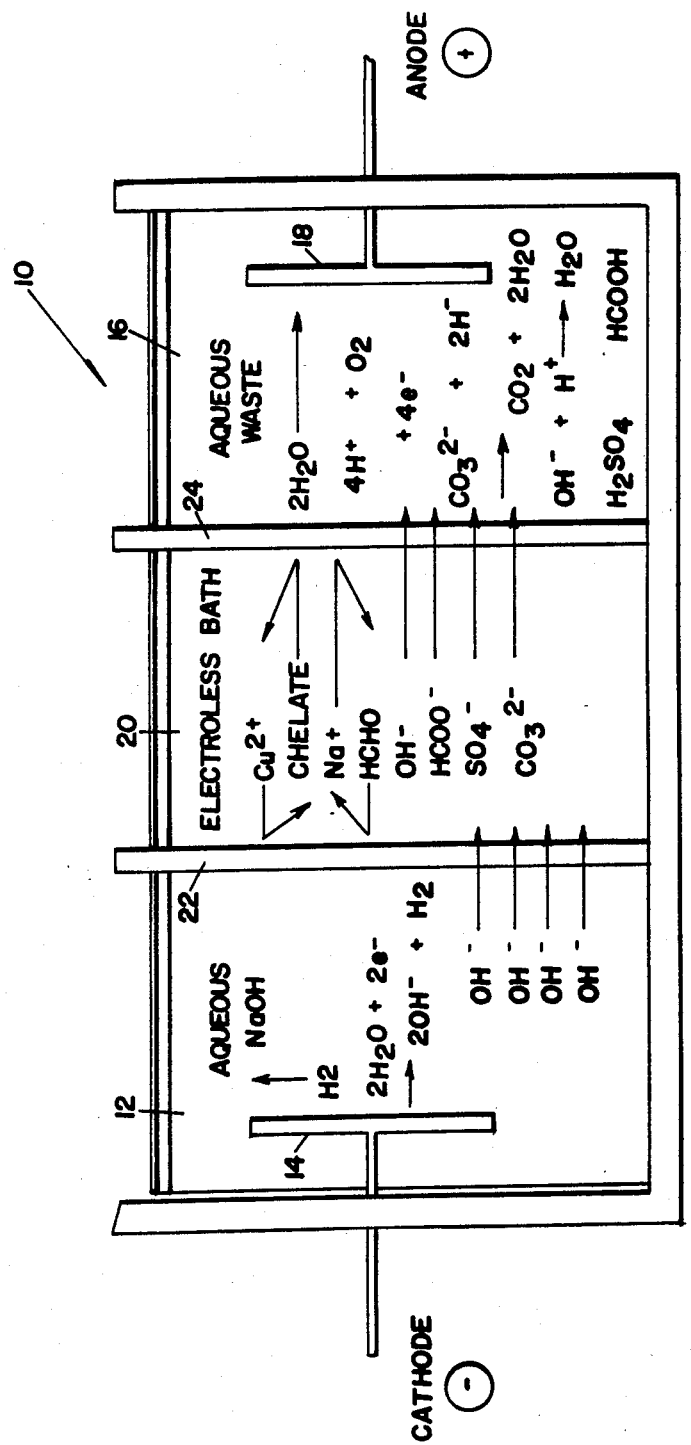
FIG. 1 is a schematic illustration of a three-compartment electrodialytic cell for removing waste products from an electroless copper plating solution and for replenishing the solution with hydroxyl ions.

In FIG. 1 there is shown an electrodialytic cell 10 for chemically maintaining an electroless copper plating solution, specifically for removing waste products from the solution and for replenishing the copper plating solution with hydroxyl ions. The cell 10 includes three compartments that are sealed from the atmosphere comprising a cathode compartment 12 containing a dimensionally stable planar cathode 14 that may be made of steel, an anode compartment 16 containing a dimensionally stable planar anode 18 that may be made of titanium plated with platinum, and an intermediate compartments 20 defined by anion permselective exchange membranes 22 and 24. Membranes 22 and 24 separate the intermediate compartment 20 from the cathode compartment 12 and the anode compartment 16, respectively. The compartment 12 contains a catholyte solution that may comprise aqueous NaOH; the compartment 16 contains an anolyte solution that may comprise an aqueous waste acid that is produced during the electrodialysis process; and the compartment 20 contains an electroless copper plating bath solution to be chemically maintained.

With positive and negative direct current electrical potentials applied to the anode electrode 18 and to the cathode electrode 14, respectively, as shown in the drawings, the electrochemical half reaction occuring at the cathode electrode 14 is, as follows:

$$2 H_2O + 2e^- \rightarrow 2 OH^- + H_2 \uparrow \qquad (5)$$

The sodium hydroxide is used simply for the purpose of maintaining alkalinity of the catholyte and of creating a concentration gradient of hydroxide across the associated permselective exchange membrane 22 to improve the efficiency of migration. Hydrogen gas is vented from the cathode compartment 12.

The electrochemical half reaction occurring at the anode electrode 18 is, as follows:

$$2 H_2O \rightarrow 4H^+ + O_2 + 4e^- \qquad (6)$$

The generated oxygen is vented from the anode compartment.

Combining the cathode and anode processes, the following electrochemical reaction is derived by doubling the reaction of equation (5) and adding it to the reaction of equation (6):

$$6 H_2O \rightarrow 4 OH^- + 4H^+ + 2 H_2 \uparrow + O_2 \uparrow \qquad (7)$$

Hydroxyl ions are produced at the cathode electrode 14 and hydronium ions are produced at the anode electrode 18.

As previously mentioned, the electroless copper bath solution to be chemically maintained is contained in the intermediate compartment 20 which separates the cathode electrode 14 from the anode electrode 18. Upon application of the direct electrical current potential between the cathode electrode 14 and the anode electrode 18, hydroxyl ions produced at the cathode electrode 14 migrate across the permselective exchange membrane 22 associated with the cathode electrode 14 into the electroless copper plating solution in compartment 20. Sulfate, formate and hydroxyl ions produced in the electroless copper solution in compartment 20, in turn, migrate across the permselective exchange membrane 24 associated with the anode electrode 18 into the anolyte solution in the anolyte compartment 16. Hydronium ions are produced in the anolyte solution creating sulfuric acid from the accumulating sulfate and carbonic acid from the accumulating carbonate.

As a result of this process, the sulfate, formate and carbonate by-products that tend to build-up in the electroless copper plating bath are removed and replaced with fresh hydroxide. There is no build-up of cations such as sodium in the bath.

Figure 2:
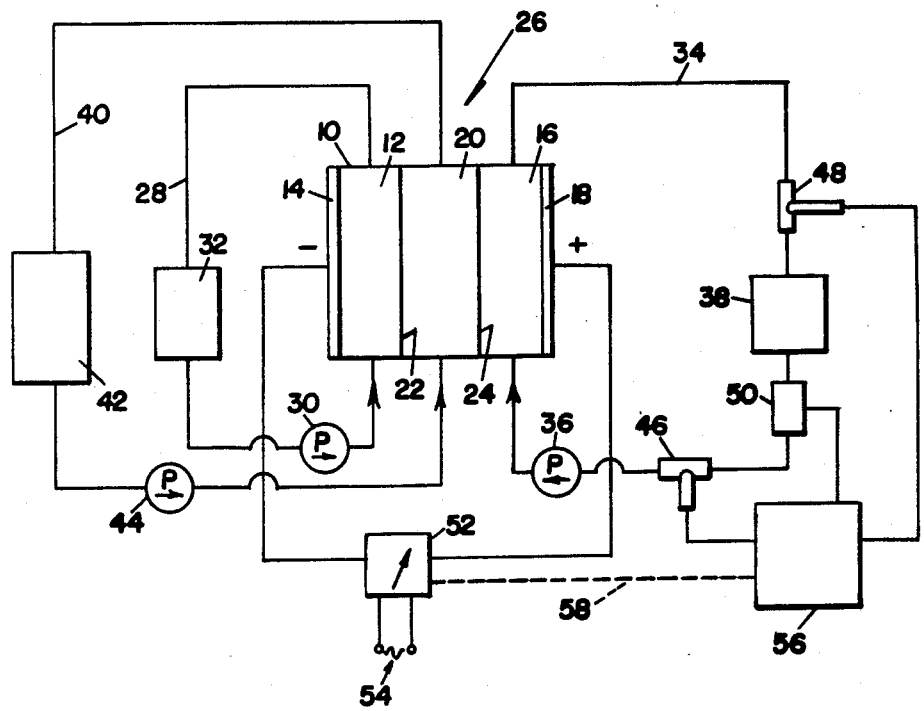
FIG. 2 is a schematic illustration of an electrodialysis system employing an electrodialytic cell as shown in FIG. 1 in accordance with the invention.

FIG. 2 is a schematic illustration of a system and process designated by the reference numeral 26, employing a three-compartment electrodialytic cell, such as the cell 10 of FIG. 1, according to the present invention for chemically maintaining an electroless copper plating bath. While a single three-compartment cell is shown in system 26, it is preferred to employ, as disclosed in the aforementioned Korngold pending application for patent, a plurality of appropriately connected electrodialytic cells 10. In such a preferred embodiment, the connection of the cells may be in series, in a parallel or in a series-parallel relationship as necessary or appropriate for achieving maximum efficiency.

It is noted, also, that the showing in the drawings of the compartments 12, 16 and 20 of the electrodialytic cell 10 as having a relatively large dimension in the direction between the cathode 14 and the anode 18 is for purposes of illustration only. Thus, a preferred arrangement for each of the electrodialytic cells 10 is a relatively thin, closely packed structure with the ratio of the fluid volume within each of the compartments 12, 16 and 20 to the active surface area of one side of an associated permselective exchange membrane 22 or 24 being very low, for example, of the order of 1 to 5 or even lower.

In the system of FIG. 2, catholyte and, in particular, an aqueous solution of sodium hydroxide, is fed to the cathode compartment 12 and recirculated around a circuit 28 by a pump 30. While a source 32 of sodium hydroxide has been shown as included in circuit 28, such a source 32 may be dispensed with for some applications since the electrodialytic cell 10 manufactures its own sodium hydroxide. For such applications, it may be sufficient to provide an initial charge of aqueous sodium hydroxide in compartment 12 and circuit 28.

Anolyte, comprising an aqueous solution of sulfuric acid, is fed to the anode compartment 16 and recirculated around a circuit 34 by a pump 36. A source 38 of dilute sulfuric acid may be included in circuit 34 to maintain the acidity of the anolyte solution at a suitable level.

Figure 3:
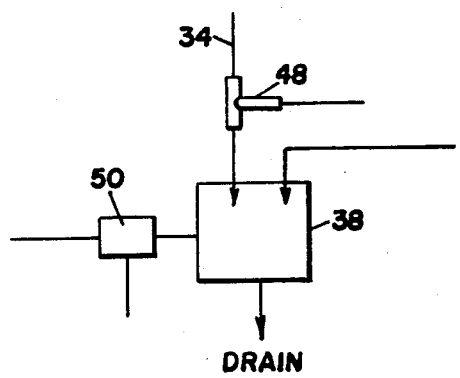
FIG. 3 illustrates a modification of the system of FIG. 2.

Preferably, as shown in FIG. 3, the source 38 may comprise piping tap water, modified as previously explained, or deionized water, directly to the anode compartment 16 through circuit 34. Since the conductivity of deionized water is too low to allow such a solution to be used as anolyte in unmodified form, a percentage, which may be substantial, of the anolyte output from the cell 10 may diverted from the drain and recirculated with the incoming deionized or tap water.

This arrangement has the added advantages of allowing a reduction of the voltage in the cell and of providing increased waste transfer efficiency due to the lower acid content of the anolyte solution. An additional advantage is enhanced cell cooling resulting from the cooling capacity of the tap or deionized water and, hence, reduction in the need for external refrigeration or cooling coils for the electroless copper plating bath solution.

Electroless copper plating bath solution is fed through and recirculated around a circuit 40 to the intermediate compartment 20 of the electrodialytic cell 10 from an electroless copper plating bath 42 by a pump 44.

Pumps 30, 36 and 44 preferably are identical low pressure pumps having no metallic parts in contact with the solution being pumped. By this means, the pressures on the opposite sides of the permselective exchange membranes 22 and 24 are maintained substantially the same at all times, avoiding any tendency for the creation of differential pressures or forces that might stretch and distend and thereby tear or otherwise rupture the membranes. The use of pumps having no metallic parts in contact with the fluid being pumped avoids undesired plating out of copper that might otherwise occur due to stray electrical currents.

In accordance with the invention, two hydrogen ion or pH sensors 46 and 48 are suitably positioned in the anolyte stream or solution in the anolyte circuit 34. Specifically, as shown in FIG. 2, sensor 46 is positioned in the circuit 34 to measure the hydrogen ion potential of the anolyte stream at the entrance to the anolyte compartment 16 of the electrodialysis apparatus 10. Sensor 48 is positioned in the circuit 34 to measure the hydrogen ion potential of the anolyte stream at the exit from the anolyte compartment 16. Such positioning of the pH sensors may be effected in a manner known to those skilled in the art. For example, the conduit or pipe forming the circuit 34 may be tapped and suitable fittings utilized to enable the sensing tips of each of the pH sensors 46 and 48 to be immersed in the anolyte stream.

The difference in pH measurement of the two sensors 46 and 48 provides a measure of the change in hydrogen ion content of the anolyte solution as the anolyte solution flows through the anolyte compartment 16, and, therefore, as explained hereinbefore, of the net OH⁻ introduced into the electroless copper solution in the intermediate compartment 20.

In a preferred embodiment, each of the pH sensors 46 and 48 comprises a type R-5994-28 double junction hydrogen ion sensor manufactured and sold by Cole Palmer, Chicago, Ill. It will be understood, however, that the invention is not to be limited to the use of such hydrogen ion sensors or type of hydrogen ion sensors and that other methods and apparatus may be employed, in practicing the invention, to measure the difference in hydrogen ion potential at the entrance to and exit from the electrodialysis apparatus 10. Thus, the difference in hydrogen ion content of the anolyte solution in circuit 34 at the entrance and at the exit of apparatus 10 may be measured in other known ways, such, for example, as by colorimetric, conductivity, specific gravity, refractive index or titration methods.

The pH sensors 46 and 48 each provide an output signal in the form of an electrical voltage that is indicative of the instantaneous hydrogen ion content of the anolyte solution at the region in which the tip of the sensor is immersed.

In accordance with the invention, the pH of the influent anolyte stream to the anolyte compartment 16 is selected to be less than 2 and preferably less than 1.7. The pH of the effluent anolyte stream from the anolyte compartment may vary to a value down to 0.9 or lower depending upon the volume of the anolyte solution that is recirculated, the extent of waste concentration in the electroless copper plating solution bath, the electrical current density used, the flow rate of the anolyte stream, etc.

For measuring the flow of anolyte solution through circuit 34 of the electrodialysis apparatus 10, there is provided a flowmeter 50. The flowmeter 50 may be of a known orifice or other commercially available type suitable for measuring a quantity of anolyte solution passing a given section of the anolyte circuit 34 per unit of time, specifically, liters per minute, and includes appropriate means (not shown) for converting such measurement into a representative electrical signal.

The gross rate of hydroxide addition to the electroless copper solution in compartment 20 of the electrodialytic cell 10 is controlled by the adjustment of a direct electrical current control device 52 that is connected in circuit with and energized by an alternating electrical current source 54. Hydroxide synthesis follows Faraday's law. Hence, it is a direct function of the magnitude of the electrical current. Device 52 may comprise a suitable adjustable rectifier means as known in the art.

Responsive to the differential signal generated by sensors 46 and 48 and the signal generated by the flowmeter 50 is an electrical measuring and control device 56. Device 56, in a preferred embodiment comprises a computer, specifically a commercially available Compudas computer, and provides a control force in response to the measurement of the anolyte solution pH content and the flow thereof for adjusting the adjustable rectifier device 52. The means for enabling such adjustment by computer 56 is indicated in FIG. 2 by the dotted line 58.

The hydrogen ion sensors 46, 48, flowmeter 50, rectifier 52 and computer 56 each per se form no part of the present invention and, hence, will not further be described herein.

The output terminals of rectifier device 52 are connected in circuit with the cathode electrode 14 and the anode electrode 18 of the electrodialytic cell 10. By this means, the electrical current to the electrodialytic cell 10 is adjusted in accordance with the difference in hydrogen ion content of the anolyte solution in circuit 34 entering and exiting the anolyte compartment 16 of cell 10 and, hence, as explained hereinbefore, in accordance with the net OH⁻ rate of hydroxide addition to the electroless copper solution in the intermediate compartment 20. As a result, the electrical current to the electrodialytic cell 10 is automatically adjusted as required to maintain the OH⁻ production at the rate required by the operation of the electroless copper plating bath.

It is noted that the net rate of addition of hydroxyl ions to the electroless copper solution is a constantly changing complex equation. The anion exchange membrane 24 separating the waste anolyte solution from the electroless copper solution allows all anions to migrate therethrough. Thus, as shown in FIG. 1, $OH^-$, $CO_3^{2-}$, $SO_4^{2-}$, and $HCOO^-$ all migrate into the anolyte compartment 16 and thus into the anolyte waste stream. Hydrogen ions are generated at near 100% efficiency in the anolyte solution in the same manner as are hydroxyl ions in the catholyte solution. The result is an infinite sink for hydroxyl and carbonate ions as they react instantly with $H^+$ in the anolyte. The concentration of $SO_4^{2-}$ and $HCOO^-$ in the anolyte solution is determined by the flow rate through the electrodialytic cell 10, the loading factor of the electroless copper plating bath 42 and thus the rate of waste generation in the electroless copper plating bath, and the magnitude of electrical current used. It is also a function of the specific concentrations of the $OH^-$ and $SO_4^{2-}$ used in the formulation of the electroless copper plating bath.

In the electroless copper plating bath solution, the proportion of anions transferring across the membrane 24 of cell 10 is a function of their relative concentrations in the electroless copper plating solution. As the sulfate and formate ions are removed, a progressively greater proportion of hydroxyl ions are also removed. The rate of removal of wastes decreases as their concentration in the electroless copper plating bath solution decreases. Thus, the net $OH^-$ regeneration rate, as well as the net production efficiency of the electrodialytic cell 10, decreases also. In this way stable operation of the electroless copper plating bath is controlled and maintained.

The relevant electrochemical equations are the following equations (8) through (11):

$$OH^- (Gross) = H^+ (Gross) = It\ (0.0373) \quad (8)$$

where t is the time in hours, I is the electrical current in amperes, and 0.0373 equals moles/faraday.

The net hydroxide concentration of the electroless copper solution is given by the flux across the anion exchange membrane 22 from the catholyte, $OH^-$ (Gross), and the corresponding flux across the anion exchange membrane 24 to the anolyte solution compounded by the useage in the plating bath and Cannizaro reactions.

$$OH^- (Net) = OH^- (Gross) - \frac{\delta OH^-}{\delta t} \quad (9)$$

where $\delta$ is the concentration dependent flux at any given time.

The removal rate of $OH^-$ from the electroless copper bath into the anolyte is constantly changing. In order to maintain electrochemical balance, the total ionic flux across each of the ionic exchange membranes 22 and 24 has to be the same at each membrane. Therefore, the net total flux into the anolyte solution is:

$$H^+ (Gross) = \quad (10)$$

$$\frac{\delta OH^-}{\delta t} + 2\frac{\delta SO_4^{2-}}{\delta t} + 2\frac{\delta CO_3^{2-}}{\delta t} + \frac{\delta HCOO^-}{\delta t}$$

and the net hydrogen ion concentration is $$H^+ (Net) = H^+ (Gross) - 2\frac{\delta CO_3^{2-}}{\delta t} - \frac{\delta OH^-}{\delta t}$$

If only $SO_4^{2-}$ and $HCOO^-$ were removed, prolonged electrodialysis would quickly strip all anions except $OH^-$ from the electrodialytic cell 10. The electroless copper plating bath pH would rapidly increase and the bath would decompose. The anion removal rates, however, are a function of the relative concentration of each anion. This operating principle ensures that only a certain pH increase is possible even during long operation without replenishing and plating.

The inverse of this principle is that net hydroxide production efficiency increases as the electroless copper plating bath is used. The faster waste products are generated, the greater the rate at which they are removed relatively to the hydroxyl ion concentration in the bath.

Thus, in accordance with the invention there has been provided in a process for electroless copper plating bath control and purification including the removal by electrodialysis through a first anion permselective exchange membrane, membrane 24, of waste products, specifically sulfate and formate, from the bath into the aqueous anolyte solution in compartment 16, and the simultaneous replenishment of the bath through a second anion permselective exchange membrane, membrane 22, with hydroxyl ions that are synthesized in the aqueous metal hydroxide solution in the catholyte compartment 12, an improved method for measuring the hydroxyl ion production in the bath. The improved method is characterized in that it involves the use of two pH sensors in the anolyte stream, one before and one after the anolyte compartment 16 of the electrodialysis cell 10, to provide much better reliability and accuracy for the net $OH^-$ production.

There has also been provided, according to the invention, a method of and apparatus for responding to such measurement of the hydrogen ion potential of the influent and effluent anolyte solution for adjusting the hydroxyl ion production in the electroless copper plating bath in accordance with the requirements of the bath during the operation thereof.

With this description of the invention in detail, those skilled in the art will appreciate that modifications may be made to the invention without departing from its spirit. Thus, it is not intended that the scope of the invention be limited to the specific embodiments described. Rather, it is intended that the scope of the invention be determined by the appended claims and their equivalents.

What is claimed is:

1. In a process for the replenishment of an electroless copper plating solution that tends to become depleted as the result of the reduction of a water soluble cupric salt in an alkaline solution under copper plating and reducing conditions, said solution when becoming depleted tending to contain alkali metal and other salts as reaction waste products, said process including the removal by electrodialysis, through a first anion permselective membrane, of such waste products from the electroless copper plating solution into an aqueous acid anolyte solution, and the simultaneous replenishment of the electroless copper plating solution, through a second anion permselective membrane, with hydroxyl ions electrosynthesized, in an aqueous metal hydroxide catholyte solution, the improvement comprising measuring the net hydroxyl ion production in the electroless copper plating solution by measuring the net hydronium ion production in the anolyte solution.

2. In a process as defined by claim 1 wherein each of the catholyte and electroless copper plating solutions comprise recirculating flows with a portion of the anolyte solution being recirculated, the remainder of the anolyte solution being discarded and replaced with deionized water, and wherein the measurement of the hydroxyl ion production in the electroless copper plating solution includes measuring the difference in the hydrogen ion potentials of the effluent and influent anolyte solutions.

3. In a process as defined by claim 2 wherein the hydroxyl ion production in the electroless copper plating solution is measured by immersion of the tip of a first pH sensitive sensor in the influent anolyte solution and the tip of a second pH sensitive sensor in the effluent anolyte solution.

4. In a process as defined by claim 1 wherein each of the anolyte, catholyte and electroless copper plating solutions comprise recirculating flows, and wherein the measurement of the net hydronium production in the anolyte solution includes measuring the hydronium content of the effluent and influent anolyte solutions, measuring the flow rate of the anolyte solution, and multiplying the difference between the hydronium ion content measurements of the effluent and influent anolyte solutions by the flow rate of the anolyte solution.

5. In a process for the replenishment of an electroless copper plating solution that tends to become depleted as the result of the reduction of a water soluble cupric salt in an alkaline solution under copper plating and reducing conditions, said solution when becoming depleted tending to contain alkali metal and other salts as reaction waste products, said process including the removal by electrodialysis through a first anion permselective membrane, of such waste products from the electroless copper plating solution into an aqueous acid anolyte solution, and the simultaneous replenishment of the electroless copper plating solution, through a second anion permselective membrane, with hydroxyl ions electrosynthesized in an aqueous metal hydroxide catholyte solution, and including a flow of direct electrical current through the various solutions and membranes to effect the electrodialysis and electrosynthesis, the improvement comprising controlling the replenishment of the electroless copper plating solution by measuring the hydroxyl ion production in the electroless copper plating solution by measuring the net hydronium ion production in the anolyte solution, and adjusting the magnitude of the direct electrical current flow through the various solutions and membranes in accordance with the measured net hydronium ion production in the anolyte solution.

6. In a process as defined by claim 5 wherein each of the catholyte and electroless copper plating solutions comprise recirculating flows with a portion of the anolyte solution being recirculated, the remainder of the anolyte solution being discarded and replaced with deionized water, and wherein the measurement of the net hydronium production in the anolyte solution includes measuring the difference in the hydrogen ion potentials of the effluent and influent anolyte solution, of measuring the flow rate of the anolyte solution, and of multiplying the difference in the hydrogen ion potentials of the effluent and influent anolyte solutions by the flow rate of the anolyte solution.

7. In a process as defined by claim 6 wherein the measurement of the hydroxyl ion production in the electroless copper plating solution includes immersion of the tip of a first pH sensitive sensor in the influent anolyte solution and the tip of a second pH sensitive sensor in the effluent anolyte solution.

8. Apparatus for the replenishment of an electroless copper plating solution that tends to become depleted as the result of the reduction of a water soluble cupric salt in an alkaline solution under copper plating and reducing conditions, said solution when becoming depleted tending to contain alkali metal and other salts as reaction waste products, comprising:

electrodialysis means including an aqueous metal hydroxide catholyte solution and an aqueous sulfuric acid anolyte solution with first and second anion permselective membranes separating said anolyte solution and catholyte solution, respectively, from said electroless copper plating solution, and further including means to cause the passage of a direct electrical current flow through said first and second anion permselective membranes thereby to effect the removal by electrodialysis of said waste products from said electroless copper plating solution through said first permselective membrane into said anolyte solution, and the simultaneous replenishment of the electroless copper plating solution through said second anion permselective, membrane with hydroxyl ions electrosynthesized in said catholyte solution, and means to measure the hydroxyl ion production in said electroless copper plating solution by measuring the net hydronium ion production in the anolyte solution.

9. Apparatus as defined by claim 8 wherein said catholyte and electroless copper plating solutions are recirculating flows with a portion of the anolyte solution being recirculated, the remainder being discarded, further including means to replace the discarded anolyte solution with deionized water, and wherein the means to measure the hydronium ion production in the anolyte solution includes means to measure the difference in the hydrogen ion potentials of the effluent and influent anolyte solutions.

10. Apparatus as defined by claim 9 wherein the means to measure the hydronium ion production in the anolyte solution comprises a first pH sensitive sensor having a tip immersed in the influent anolyte solution and a second pH sensitive sensor having a tip immersed in the effluent anolyte solution.

11. Apparatus as defined by claim 8 wherein each of the anolyte, catholyte and electroless copper plating solutions are recirculating flows, and wherein the means to measure the hydronium ion production in the anolyte solution includes means to measure the difference between the hydronium ion content of the effluent and influent anolyte solutions, means to measure the flow rate of the anolyte solution, and means to multiply the difference between the hydronium ion content of the effluent and influent anolyte solutions by the flow rate of the anolyte solution.

* * * * *